United States Patent
Hsu et al.

(10) Patent No.: US 10,200,676 B2
(45) Date of Patent: Feb. 5, 2019

(54) IMAGE DETECTION SYSTEM OF VEHICLE

(71) Applicant: H.P.B OPTOELECTRONIC CO., LTD, Taichung (TW)

(72) Inventors: Hsuan-Yueh Hsu, Taichung (TW); Szu-Hong Wang, Taichung (TW)

(73) Assignee: H.P.B. OPTOELECTRONIC CO., LTD, Taichung (TW)

( * ) Notice: Subject to any disclaimer, the term of this patent is extended or adjusted under 35 U.S.C. 154(b) by 82 days.

(21) Appl. No.: 15/379,967

(22) Filed: Dec. 15, 2016

(65) Prior Publication Data

US 2017/0180707 A1 Jun. 22, 2017

(30) Foreign Application Priority Data

Dec. 17, 2015 (TW) .............................. 104142613 A

(51) Int. Cl.
| | |
|---|---|
| *B60Q 9/00* | (2006.01) |
| *H04N 5/369* | (2011.01) |
| *H04N 5/235* | (2006.01) |
| *H04N 5/232* | (2006.01) |
| *H04N 7/18* | (2006.01) |
| *H04N 13/254* | (2018.01) |
| *G01S 17/46* | (2006.01) |
| *G01S 17/93* | (2006.01) |
| *G01S 13/93* | (2006.01) |

(52) U.S. Cl.
CPC ........... *H04N 13/254* (2018.05); *B60Q 9/008* (2013.01); *G01S 17/46* (2013.01); *G01S 17/936* (2013.01); *H04N 5/2357* (2013.01); *H04N 5/23293* (2013.01); *H04N 5/369* (2013.01); *H04N 7/183* (2013.01); *G01S 2013/9317* (2013.01)

(58) Field of Classification Search
None
See application file for complete search history.

(56) References Cited

U.S. PATENT DOCUMENTS

| | | | | |
|---|---|---|---|---|
| 8,635,015 | B2* | 1/2014 | Anderson | G01S 1/70 701/1 |
| 9,398,221 | B2* | 7/2016 | Mankowski | H04N 5/23216 |
| 2006/0091297 | A1* | 5/2006 | Anderson | G01S 17/08 250/221 |
| 2008/0266396 | A1* | 10/2008 | Stein | H04N 7/183 348/148 |
| 2013/0110006 | A1* | 5/2013 | Sharonov | A61B 1/00131 600/587 |
| 2015/0002720 | A1* | 1/2015 | Mankowski | H04N 5/23216 348/333.02 |

(Continued)

*Primary Examiner* — Mohammad J Rahman
(74) *Attorney, Agent, or Firm* — Muncy, Geissler, Olds & Lowe, P.C.

(57) ABSTRACT

The present invention discloses an image detection system of a vehicle for detecting at least one target object around a vehicle, and further detecting a distance between the at least one target object and the vehicle. The image detection system of the vehicle at least includes a light source unit, an image capturing unit and an alarm unit. The present invention primarily employs a laser beam incident onto the target object to form at least one optical pattern, and variation of the optical pattern and a motion object detection are collocated to effectively calculate the distance between the target object and the vehicle, thereby achieving an advantage of alarming and alerting a driver to safety of driving.

9 Claims, 14 Drawing Sheets

(56) References Cited

U.S. PATENT DOCUMENTS

2015/0145701 A1\* 5/2015 Beggs ................ B60Q 1/2673
340/944
2017/0120803 A1\* 5/2017 Kentley ................ B60Q 1/26

\* cited by examiner

IMAGE DETECTION SYSTEM OF VEHICLE

CROSS-REFERENCE TO RELATED APPLICATION

This application claims the priority of Taiwanese patent application No. 104142613, filed on Dec. 17, 2015, which is incorporated herewith by reference.

BACKGROUND OF THE INVENTION

1. Field of the Invention

The present invention generally relates to an image detection system of vehicle, and more specifically to an image detection system of vehicle for detecting a distance between a vehicle and at least one target object around the vehicle.

2. The Prior Arts

One of traditional vehicle reversing image systems for driving is shown in FIGS. 9 to 11, and generally comprises a lens 101 provided on the rear of a car body 1, and a display screen 102 internally provided in the car body 1. A first target object a and a second target object b exist behind the rear of the car body 1, and the first target object a has a height and a size the same as those of the second target object b. The lens 101 captures the first target object and the second target object b to display on the display screen 102. In the display screen 102, the first target object is visually closer to the car body 1 than the second target object b. The vision quite fits the actual situation. Please further refer to FIGS. 12 to 14. A third target object c and a fourth target object d also exist behind the rear of a car body 1, and the third target object c has a height smaller than that of the fourth target object d. Similarly, the lens 101 captures the third target object c and the fourth target object d to display on the display screen 102. However, the third target object c and the fourth target object d shown in the display screen 102 have the same height and size in vision, and it is different from the fact that the fourth target object d is actually farther from the car body 1 than the third target object c. Thus, the image captured by the above traditional vehicle reversing image system can not be used to correctly judge the actual distance between the target object and the car body 1.

As for the patents disclosed by TW 1417207 in Taiwan and U.S. 2013022589, the image system for vehicle reversing utilizes a lens to detect the distance between the target object and the car body, and collocates with some traditional image processing means like optical flow method or edge aspect method to perform further analysis. However, the product provided with the above system has poor reliability and militates against vehicle reversing applications because of low detection rate (about 95% at most) and high false judgment. In the solutions disclosed by TW M492262 and I320756, a lens and ultrasonic sensors are provided. The distance between the target object and the car body is first sensed by the ultrasonic sensors, and the vehicle reversing image and the sensed distance are then displayed on the display screen. The number of the ultrasonic sensors used is responsible for complexity of installation and the number of blind areas left. Moreover, to minimize the number of blind areas, it needs to install more ultrasonic sensors. As a result, not only complexity of installation greatly increases, but also the cost considerably surges. As for CN10329351 and U.S. Pat. No. 7,544,945, lidar (light detection and ranging) sensors are used to detect the distance between the target object and the car body. However, the lidar sensor costs much and it takes considerably huge complexity of calculation to re-build the surrounding space such that the solutions become adverse to the application of real-time detecting obstacles for vehicle reversing in consideration of the whole cost. Further, U.S. Pat. No. 7,112,867 also provides a solution that two lens are equipped to detect the distance between the target object and the car body, and particularly, the distance is calculated through triangular positioning and trigonometric functions. However, the two lens still cause the overall cost high, and it thus is not a practical solution in a view point of economy. Additionally, TW I310354 uses two light sources to emit light, respectively, penetrating two corresponding diffraction grids so as to form two optical patterns on each target object. The distance between the target object and the car body is then calculated through specific trigonometric relation for the distance between the patterns of two target objects and the distance of the patterns formed on the sensing elements. However, the cost is surely high due to two lens and two corresponding diffraction grids, and the calculation can not be implemented through one single light source. TW I358365 issued by the present inventor is used to solve the above problem, but another problem of low detection rate and high false judgment is resulted in because this patent utilizes a passive image means with the light source.

SUMMARY OF THE INVENTION

The primary objective of the present invention is to provide an image detection system of vehicle, and more specifically to an image detection system of vehicle for detecting a distance between a vehicle and at least one target object around the vehicle. The present invention primarily employs a laser beam incident onto a target object to form at least one optical pattern, and variation of the optical pattern and a motion object detection (MOD) configured together are used to effectively calculate the distance between the target object and the vehicle, thereby achieving an advantage of alarming and alerting a driver to safety of driving.

To achieve the above purpose, the image detection system of vehicle is provided to detect the at least one target object around the vehicle, and the distance between the at least one target object and the vehicle. The image detection system of vehicle comprises a light source unit, an image capturing unit and an alarm unit. The light source unit is externally provided on the vehicle and configured to comprise at least one light source for emitting a light beam, which is used to display at least one optical pattern formed on the target object. The optical pattern varies according to the distance between the target object and the vehicle. The image capturing unit is specifically provided on the vehicle corresponding to the light source unit, and comprises a lens, an image sensor connected to the lens, and a microprocessor connected to the image sensor. The lens captures and transmits an image of the target object and the optical pattern thereon to the image sensor, and the microprocessor calculates the distance between the target object and the vehicle based on the varying optical pattern on the target object by collocating a motion object detection (MOD) according to the varying image of the target object. The alarm unit is electrically connected to the microprocessor and internally provided in the vehicle. When the distance between the target object and the vehicle is smaller than a threshold value, the microprocessor transmits a message to the alarm unit, and the alarm unit generates an alarm signal based on the received message.

As mentioned above for the image detection system of vehicle of the present invention, a display unit is further included and internally provided in the vehicle. The display unit is electrically connected to the image capturing unit, and comprises at least one display screen. Specifically, the display unit has an image display region for showing the image of the target object captured by the lens and the optical pattern on the target object, and a distance display region for showing the distance between the target object and the vehicle.

As for the image detection system of the present invention, the image display region and the distance display region are shown on the same display screen or different display screens, respectively.

As mentioned above, the motion object detection (MOD) of the image detection system of vehicle is implemented by the lens capturing the image of the target object, and the microprocessor determining the distance between the target object and the vehicle based on variation of the image.

For the image detection system of vehicle according to the present invention, the at least one light source is a laser, a light emitting diode (LED) and a phosphor for emitting the light as desired.

As mentioned above, the light beam of the present invention is a visible light and invisible light.

As mentioned above, the at least one optical pattern of the present invention is implemented by one pattern formed of meshes, straight lines and regularly arranged dots.

As mentioned above, the optical sensor of the image detection system of vehicle is implemented by a CCD (Charge-Coupled Device) and a CMOS (Complementary Metal-Oxide-Semiconductor).

As the present invention mentioned above, the alarm signal generated by the alarm unit is implemented by sound, light, and vibration.

As the present invention mentioned above, the light source unit is a light flickering source having a flickering frequency as the same as the capturing frequency of the image capturing unit.

As the present invention mentioned above, the microprocessor further compares two sequential images to determine variation of the optical patterns.

Therefore, the image detection system of vehicle according to the present invention is configured to form the optical pattern on the target object around the vehicle by illuminating the laser beam, and further employs variation of the optical pattern and the motion object detection for the image provided together to effectively calculate the distance between the target object and the vehicle so as to perform individually or altogether and achieve the advantage of alarming and alerting the driver to safety of driving. In addition, the present invention effectively solves the problem in the prior arts that the traditional vehicle reversing image system is provided in series and can not independently operate. The present invention thus greatly increases reliability of image recognition and avoiding serious casualties and driving disputes. Next, the present invention forms the optical pattern by actively illuminating with the laser light source so as to actively detect any fixed obstacle around the vehicle like wall and successfully overcome the shortcoming in the prior arts of failing to detect a large area of wall. As a result, the object of improving safety of driving is achieved by decreasing possibility of wrong judgment for the driver. Further, when the laser beam as the light to detect at the related distance in the image detection system of the present invention is an active visible light, an effective auxiliary illumination is thus provided at low illumination of environmental light to increase accuracy of detection for variation of the optical pattern and resolution for motion object detection. As a result, overall reliability of the system is greatly improved, and when an invisible laser beam is utilized, the coming cars or pedestrians behind the target object are not visually affected. In particular, the light beam is still not militated by the climate or the environmental light so as to provide the image detection system with low wrong judgment and high reliability. Finally, the system of the present invention is specifically configured to trigger the microprocessor to transmit the message to the alarm unit when the distance between the at least one target object and the vehicle is smaller than the threshold value. The alarm unit then based on the received message transmits an alarm signal implemented by one of sound, light and vibration so as to remind the driver of looking out the traffic situation around the vehicle, thereby effectively achieving the advantage of alarm and driving safety.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
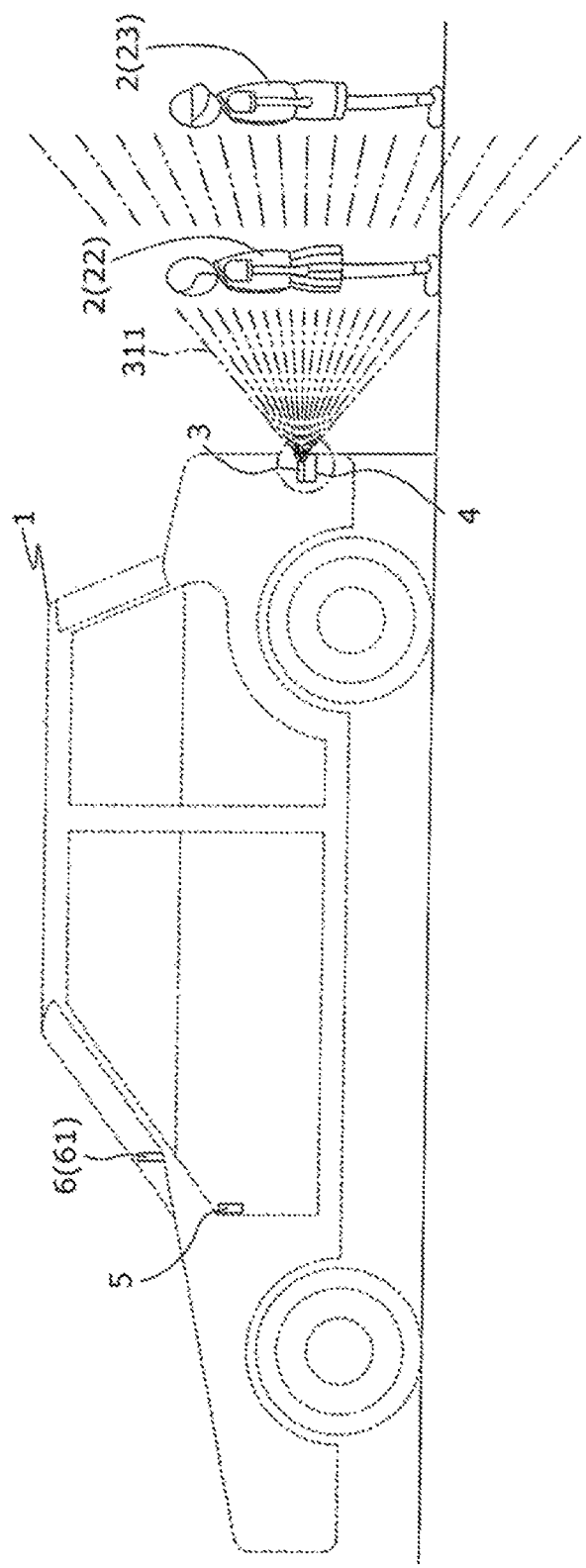
FIG. 1 is a view showing the structure configuring the car body and the image detection system of vehicle according to one embodiment of the present invention.
Figure 2:
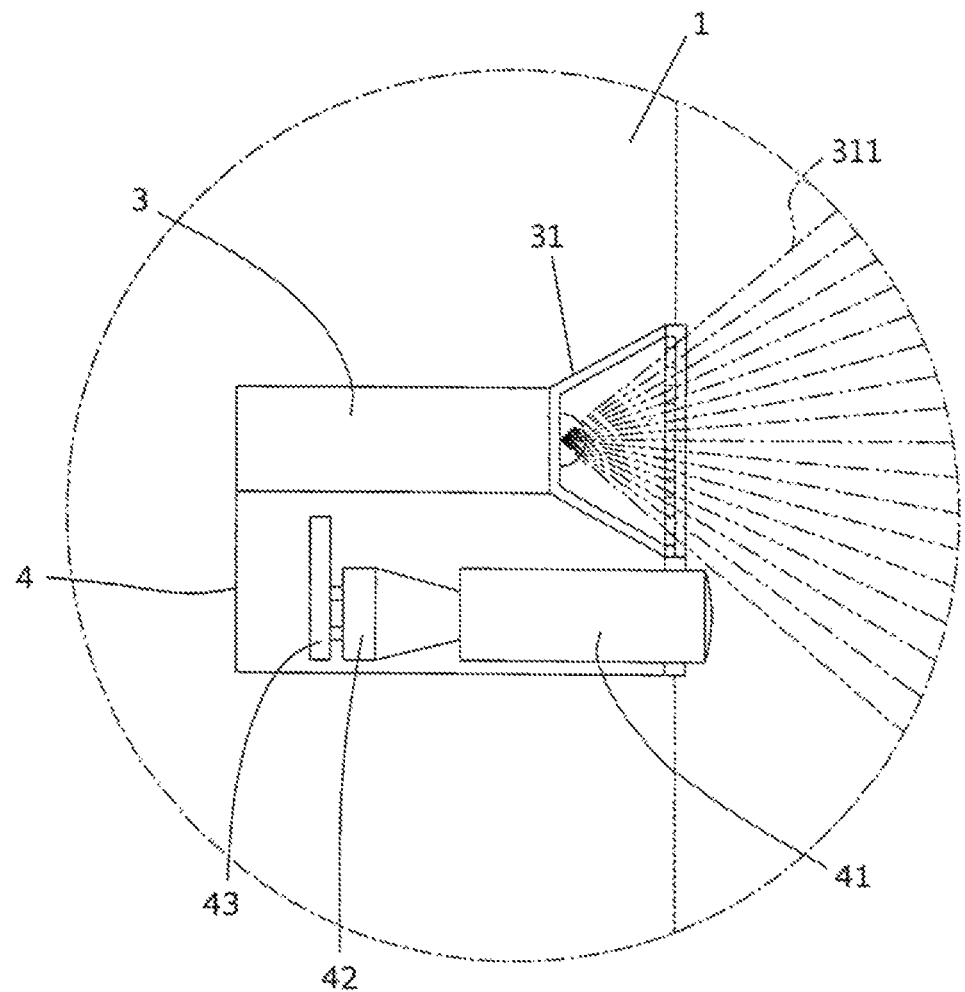
FIG. 2 is a view showing the image detection system according to the present embodiment.

Please refer to FIGS. 1 and 2 illustrating the combination structure of the car body and the image detection system of vehicle, and the individual image detection system of vehicle according to one embodiment of the present invention, respectively. As shown in FIGS. 1 and 2, the image detection system of vehicle according to the present embodiment is configured to detect at least one target object 2 around the vehicle 1, and further detects and measure the distance between the at least one target object 2 and the vehicle 1. Specifically, the image detection system of vehicle of the present embodiment at least comprises a light source unit 3, an image capturing unit 4 and an alarm unit 5.

Figure 4:
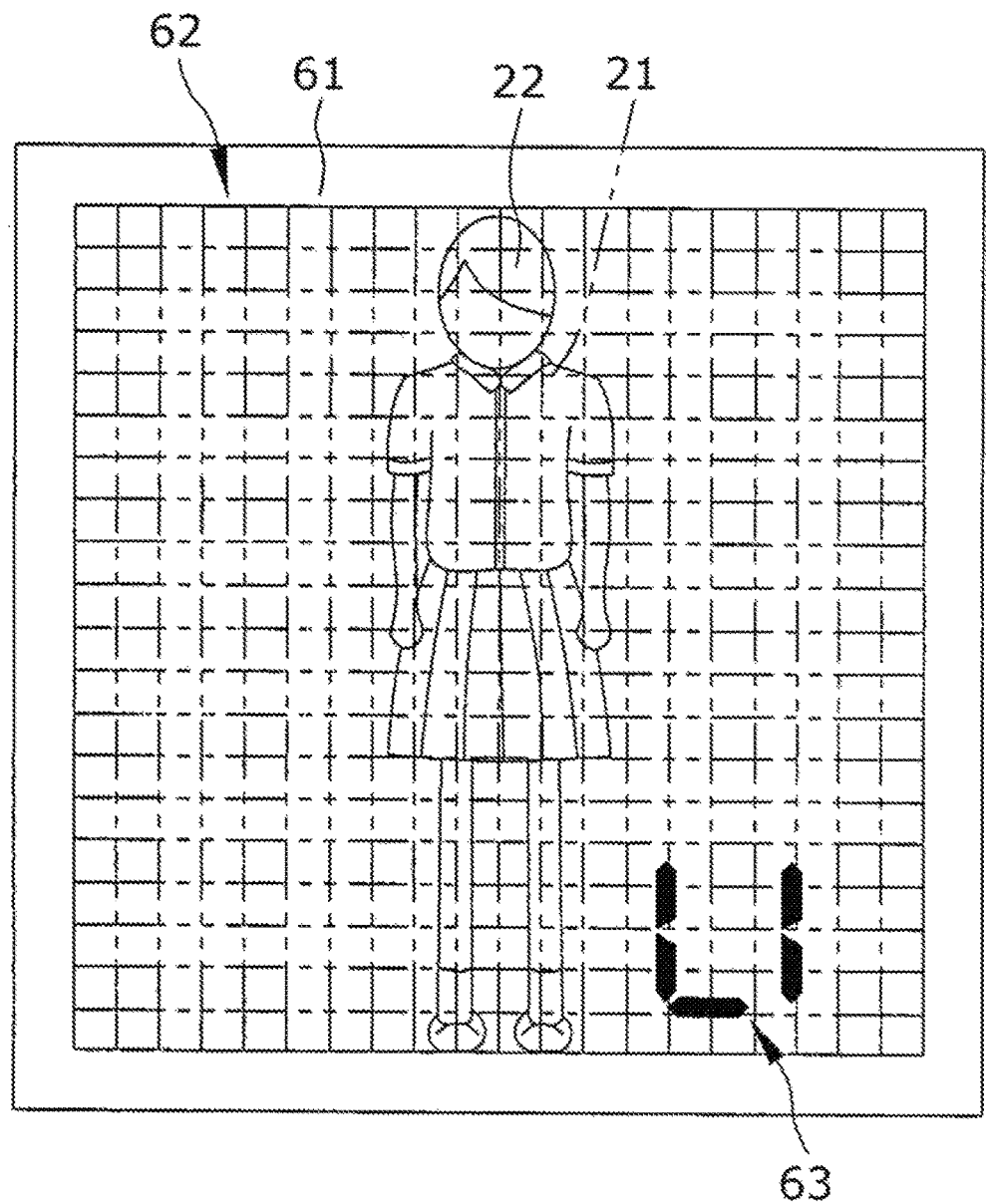
FIG. 4 is a view showing detection of the first target object through the image detection system of the present embodiment.

The light source unit 3 is externally provided on certain place of the vehicle 1 and configured to comprise at least one light source 31 for emitting a light beam 311 used to display at least one optical pattern 21 on the target object 2 (referring to FIG. 4 showing detection of the first target object through the image detection system of vehicle according to the present embodiment). The optical pattern 21 varies according to the distance between the target object 2 and the vehicle 1. Additionally, the at least one light source 31 is implemented by one of laser, a light emitting diode (LED) and a phosphor for emitting the light beam 311. The light beam 311 is one of visible light and invisible light. In the preferred embodiment of the present invention, the light source unit 3 is a light source for laser. If the light beam 311 is invisible, the cars or pedestrians behind the target object are not visually affected, and the light beam 311 is not shifted by the climate or the environmental light so as to effectively provide the image detection system with low wrong judgment and high reliability. When the light beam 311 is visible, the present invention provides an effective auxiliary illumination for low illumination of the environmental light so as to increase accuracy of detection for variation of the optical pattern 21 and resolution for motion object detection, thereby improving reliability of overall operation. The at least one optical pattern 21 is implemented by one pattern formed of meshes, straight lines and regularly arranged dots. However, it should be noted that the above optical pattern 21 shown with a specific form is only exemplary for clear explanation of the aspects of the present invention, and not intended to limit the scope of the present invention. In other words, those who are skilled in this field should understand that as long as the optical pattern 21 changes as the distance varies, implementation of the present invention will not be militated. In the preferred embodiment, the light beam 311 emitted by the laser of the light source 31 specifically provided at the rear of the vehicle 1 is incident onto the first target object 22 or the second target object 23 behind the vehicle 1 via an optical element such as a diffraction optical element (DOE) with a wide-angle zone. Thus, an optical pattern 21 is formed on the first target object 22 or the second target object 23. However, it should be noted that the above light beam 311 passing through the optical element like DOE is only exemplary for clear explanation of the aspects of the present invention, and not intended to limit the scope of the present invention. That is, those who are skilled in this field should understand that as long as the optical pattern 21 changes as the distance varies, implementation of the present invention will not be militated.

The image capturing unit 4 is externally provided on the vehicle 1 corresponding to the light source unit 3, and at least comprises a lens 41, an image sensor 42 connected to the lens 41, and a microprocessor 43 connected to the image sensor 42. Specifically, the lens 41 captures and transmits the image of the target object 2 and the optical pattern 21 thereon to the image sensor 42. The microprocessor 43 calculates the distance between the target object 2 and the vehicle 1 based on variation of optical pattern 21 on the target object 2 by combining a motion object detection (MOD) according to the varying image of the target object 2. Further, the image sensor 42 is implemented by one of a CCD (Charge-Coupled Device) and a CMOS (Complementary Metal-Oxide-Semiconductor). The motion object detection is implemented by the lens 41 capturing the image of the target object 2, and the microprocessor 43 determining the distance between the target object 2 and the vehicle 1 based on variation of the image. In the preferred embodiment of the present invention, the image detection system of vehicle detects the image of the target object 2 through variation of the optical pattern 21 and/or motion object detection individually or altogether so as to effectively overcome the drawback of the traditional vehicle reversing image system provided in series, thereby achieving the advantage of greatly increasing reliability of image recognition and avoiding serious casualties and driving disputes.

The alarm unit 5 is electrically connected to the microprocessor 43 and internally provided in the vehicle 1. Specifically, when the distance between the target object 2 and the vehicle 1 is smaller than a threshold value, the microprocessor 43 transmits a message to the alarm unit 5, and the alarm unit 5 thus generates an alarm signal based on the received message. In addition, the alarm signal generated by the alarm unit 5 is implemented by one of sound, light and vibration to effectively alert the driver to the traffic situation around the vehicle 1 and further achieve one advantage of effective alarm and driving safety. However, it should be noted that sound, light or vibration is only illustrative example for the alarm signal to clearly explain the aspects of the present invention, and not intended to limit the scope of the present invention. Therefore, those skilled in this field should well understand that different means of the alarm signal used to alert the driver to the traffic situation around the vehicle 1 will not substantially affect implementation of the present invention.

Figure 3:
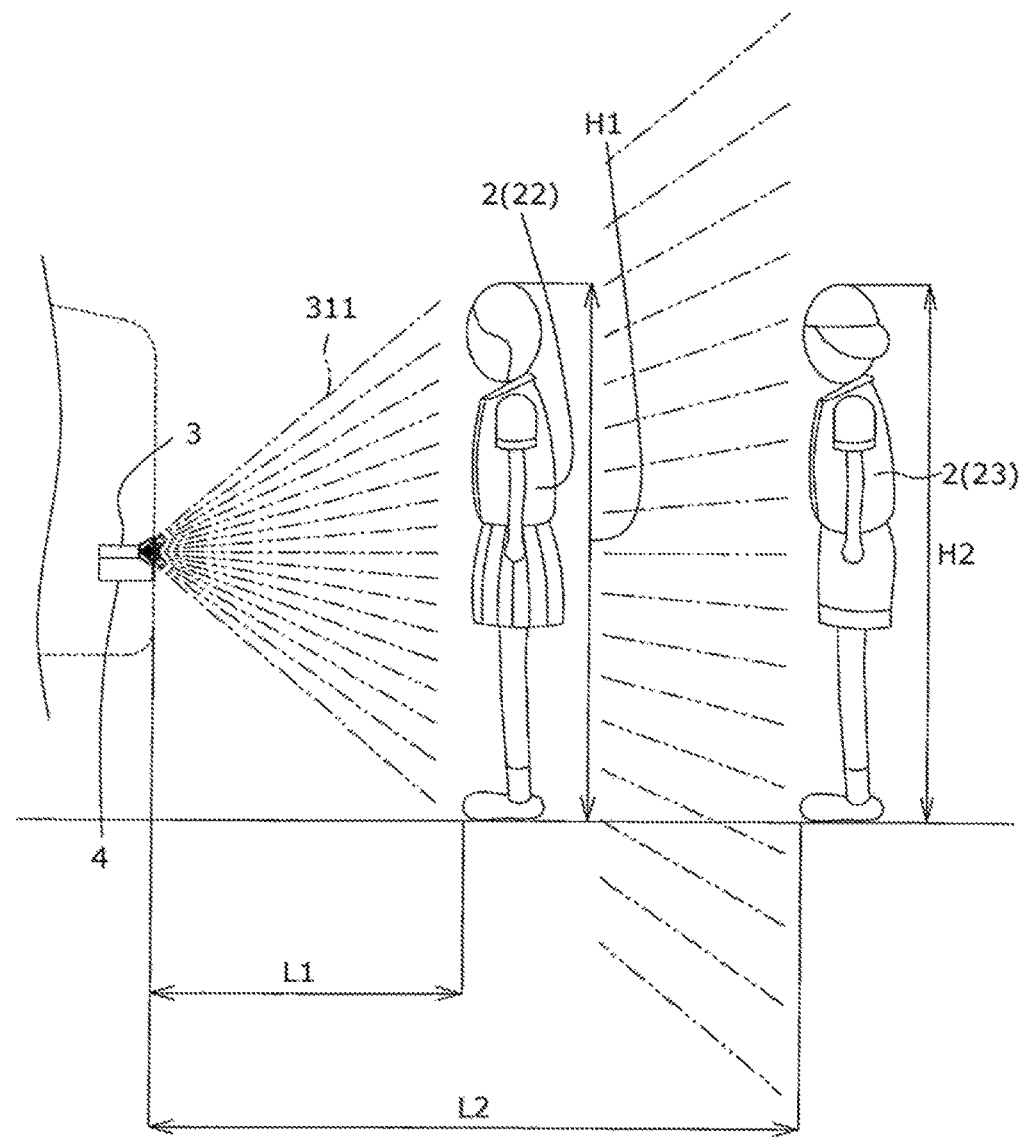
FIG. 3 is a view showing detection of the target objects through the image detection system of the present embodiment.
Figure 5:
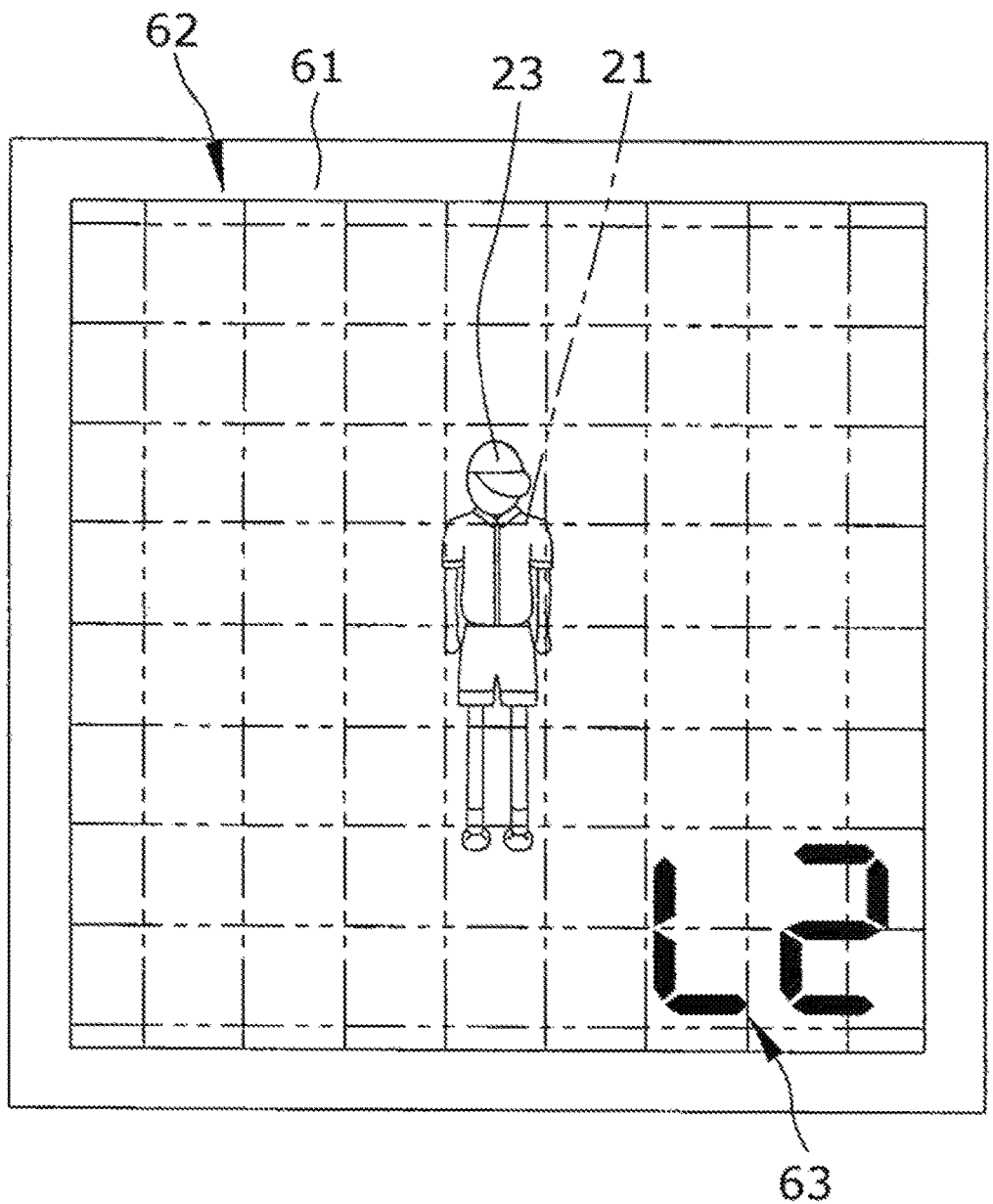
FIG. 5 is a view showing detection of the second target object through the image detection system of the present embodiment.

Furthermore, refer to FIGS. 3 to 5. FIG. 3 shows detection of the target objects through the image detection system of vehicle according to the present embodiment, and FIGS. 4 and 5 illustrate detection of the first and second target objects, respectively. The image detection system of vehicle of the present invention further comprises a display unit 6, which is specifically and internally provided at some suitable position in the vehicle 1. The display unit 6 is electrically connected to the image capturing unit 4, and comprises at least one display screen 61. The display unit 6 has an image display region 62 for showing the image of the target object 2 captured by the lens 41 and the optical pattern 21 on the target object 2, and a distance display region 63 for showing the distance between the target object 2 and the vehicle 1. Further, the image display region 62 and the distance display region 63 can be displayed on the same display screen 61, or alternatively, on different display screens 61, respectively. In the preferred embodiment, the display screen 61 is internally provided in the vehicle 1, and the image display region 62 and the distance display region 63 are shown on the same display screen 61, while the distance display region 63 is particularly configured at the bottom-right corner of the image display region 62. Thus, the image display region 62 and the distance display region 63 are viewed by the driver at the same time. In FIG. 3, the distance between the first target object 22 and the vehicle 1 is specified by the first distance L1, and the distance between the second target object 23 and the vehicle 1 is the second distance L2. The height of the first target object 22 is the first height H1, and the height of the second target object 23 is the second height H2, particularly, the first height H1 equal the second height H2. The image detection system of vehicle according to the present invention employs density variation of the mesh optical pattern 21 on the first target object 22 and the second target object 23 formed by the incident laser, and the motion object detection is collocated for image variation of the target object 2 so as to effectively determine the distance between the vehicle 1 and the first target object 22/the second target object 23. It is obvious from FIGS. 4 and 5 that density variation of the optical pattern 21 of the first target object 22 shown on the image display region 62 of the display screen 61 is tighter than that of the optical pattern 21 of the second target object 23 shown on the image display region 62 of the display screen 61, and the first target object 22 occupies larger area than the second target object 23 in the display screen 61. In particular, the difference between the first distance L1 and the second distance L2 shown in the distance display region 63 is the same as the actual situation.

Figure 6:
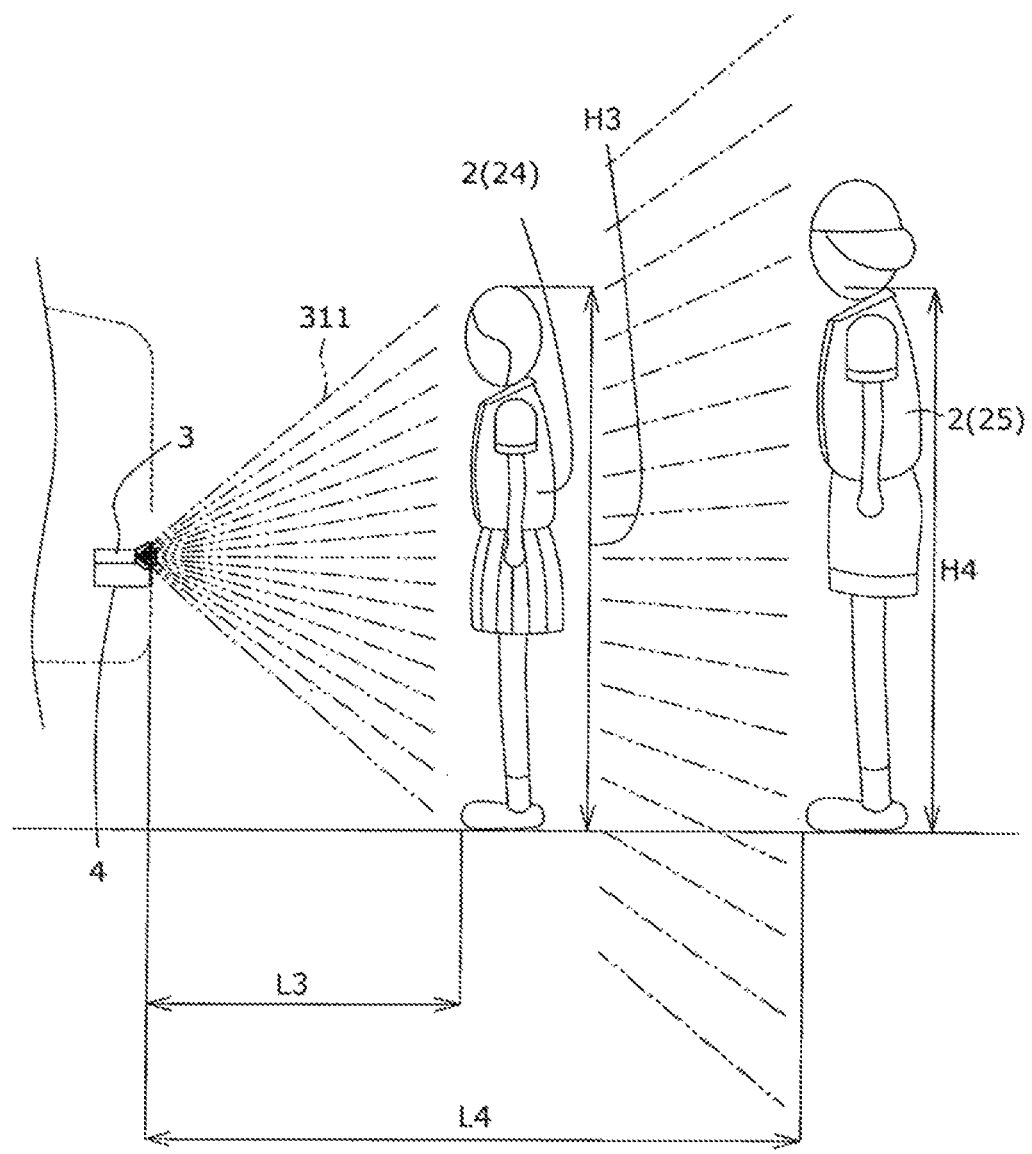
FIG. 6 is a view showing detection of the target objects through the image detection system of vehicle of the second embodiment of the present invention.
Figure 7:
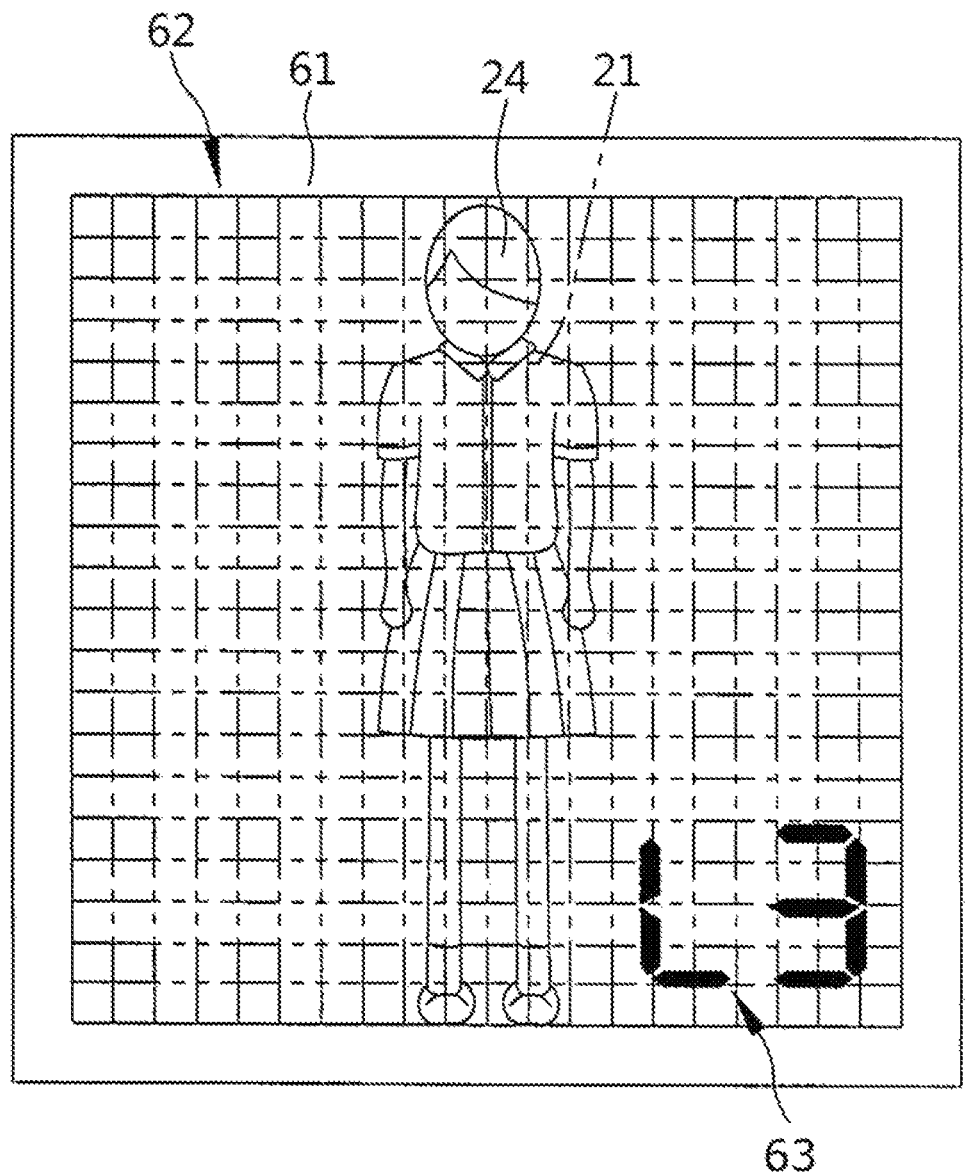
FIG. 7 is a view showing detection of the third target object through the image detection system according to the second embodiment of the present invention.
Figure 8:
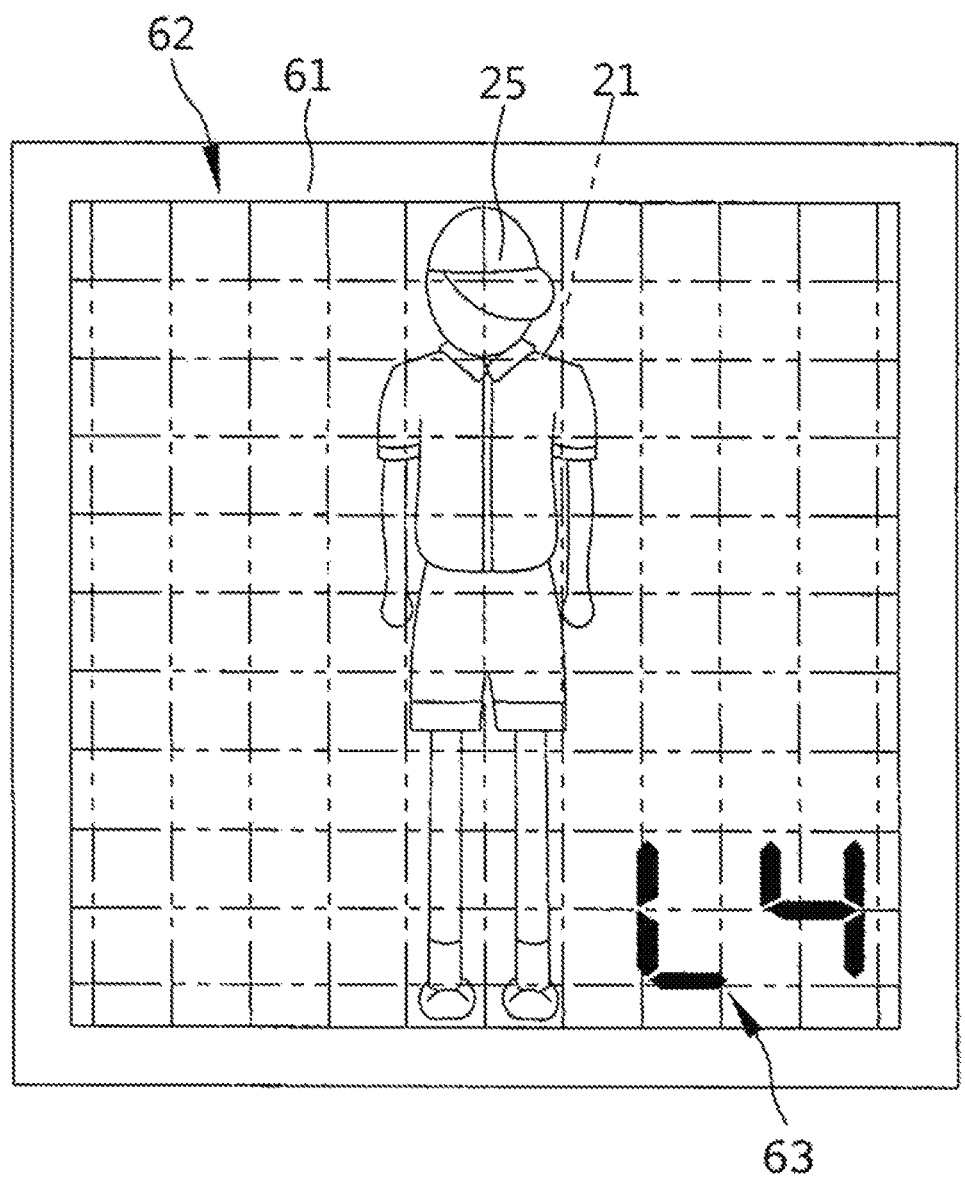
FIG. 8 is a view showing detection of the fourth target object through the image detection system of the second embodiment.
Figure 9:
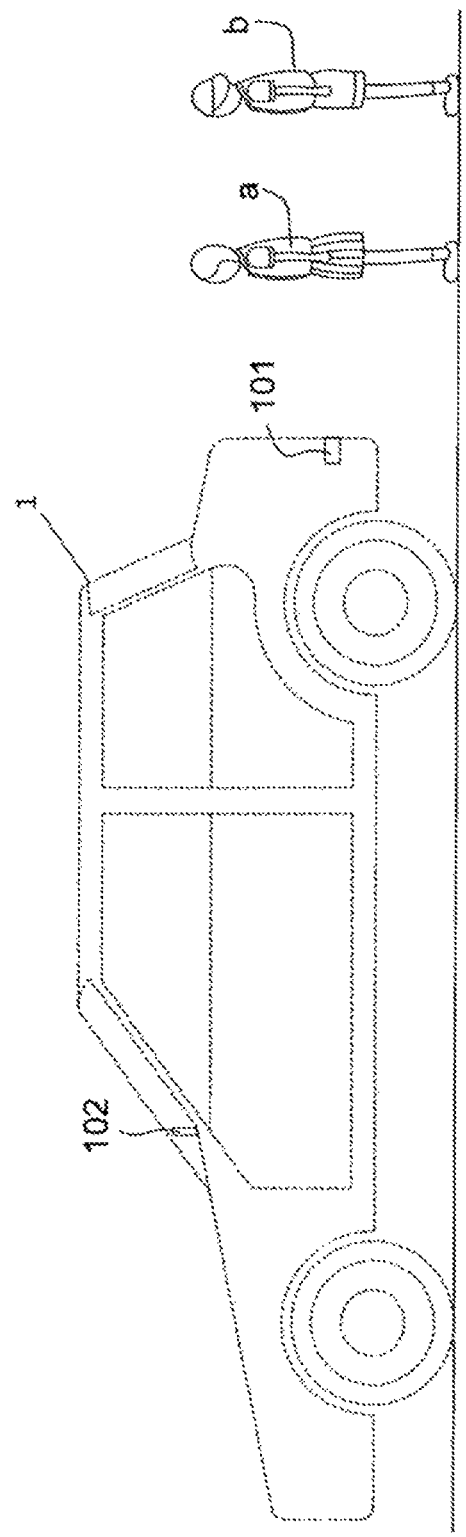
FIG. 9 is a view showing detection of the target object by use of one vehicle reversing image system in the prior arts.
Figure 10:
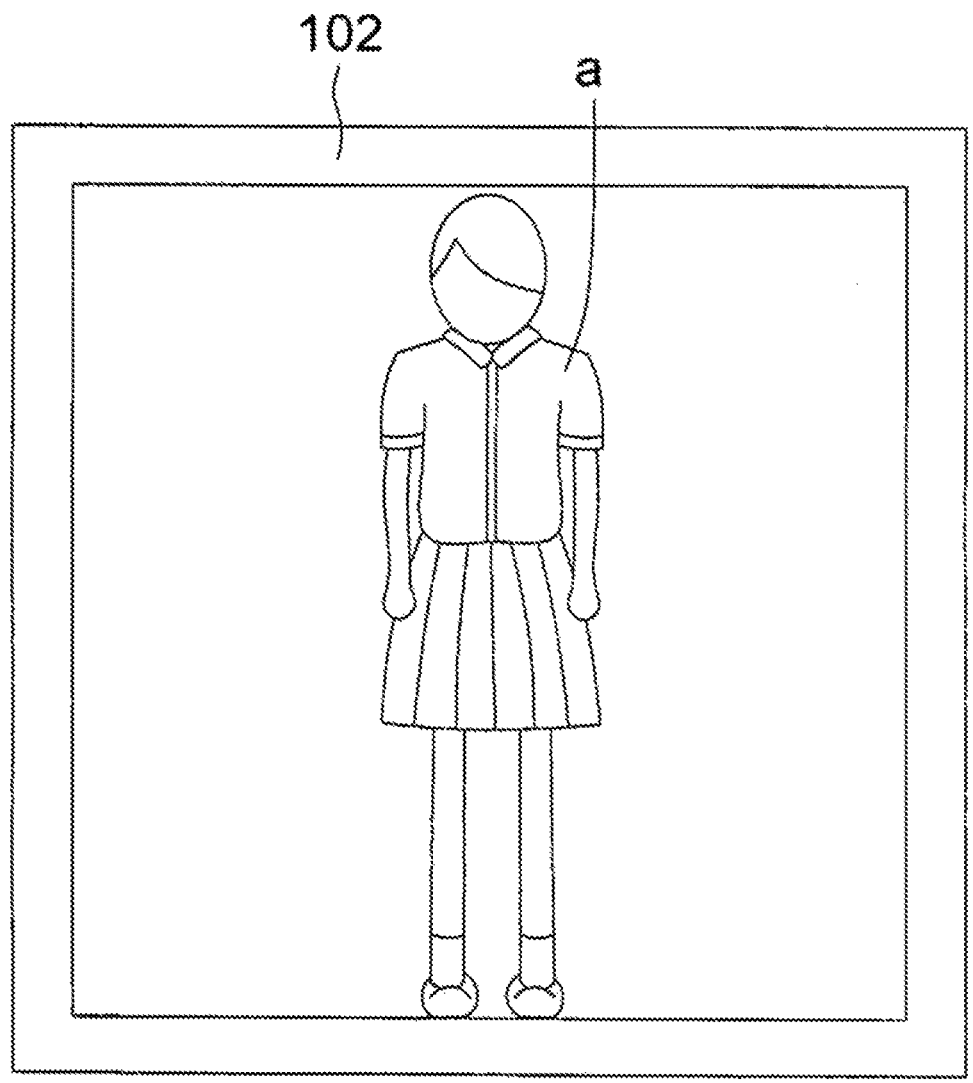
FIG. 10 is a view showing the first target object in the vehicle reversing image system of the prior arts.
Figure 11:
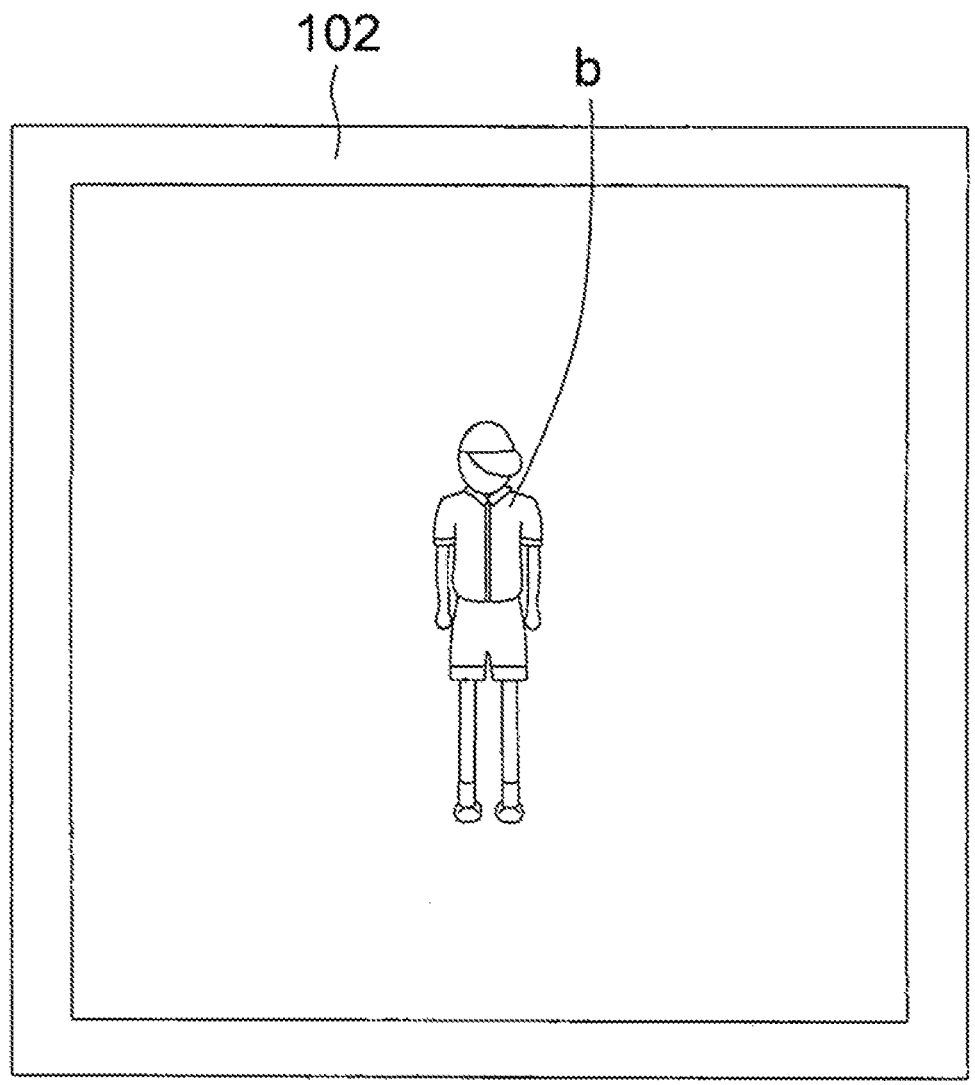
FIG. 11 is a view showing the second target object in the vehicle reversing image system of the prior arts.
Figure 12:
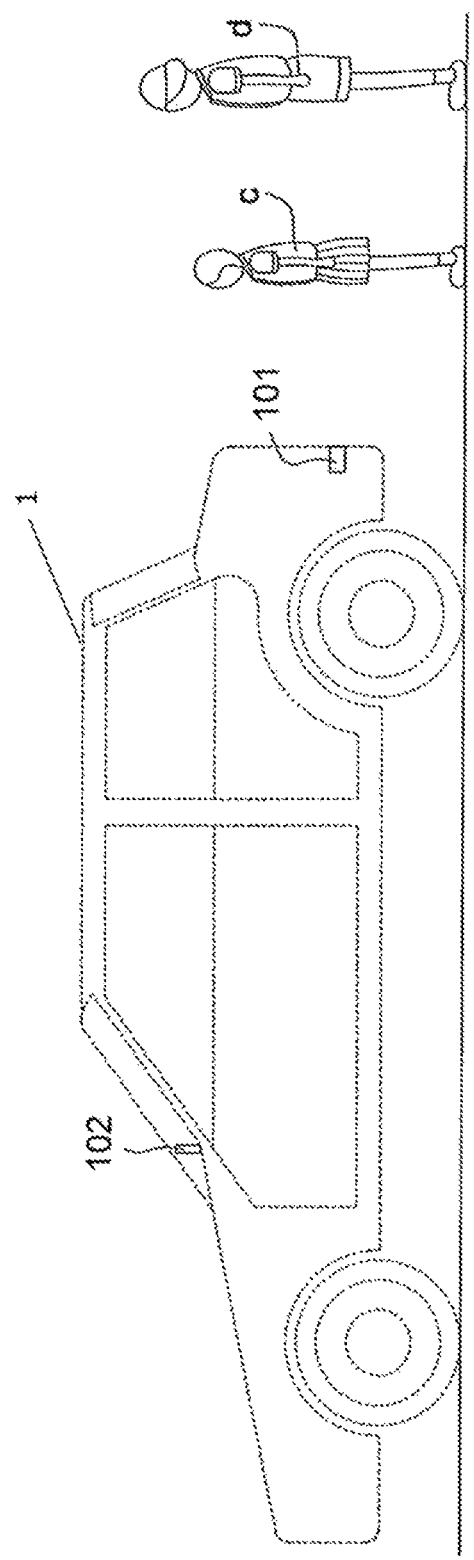
FIG. 12 is a view showing detection of another target object by use of the vehicle reversing image system in the prior arts.
Figure 13:
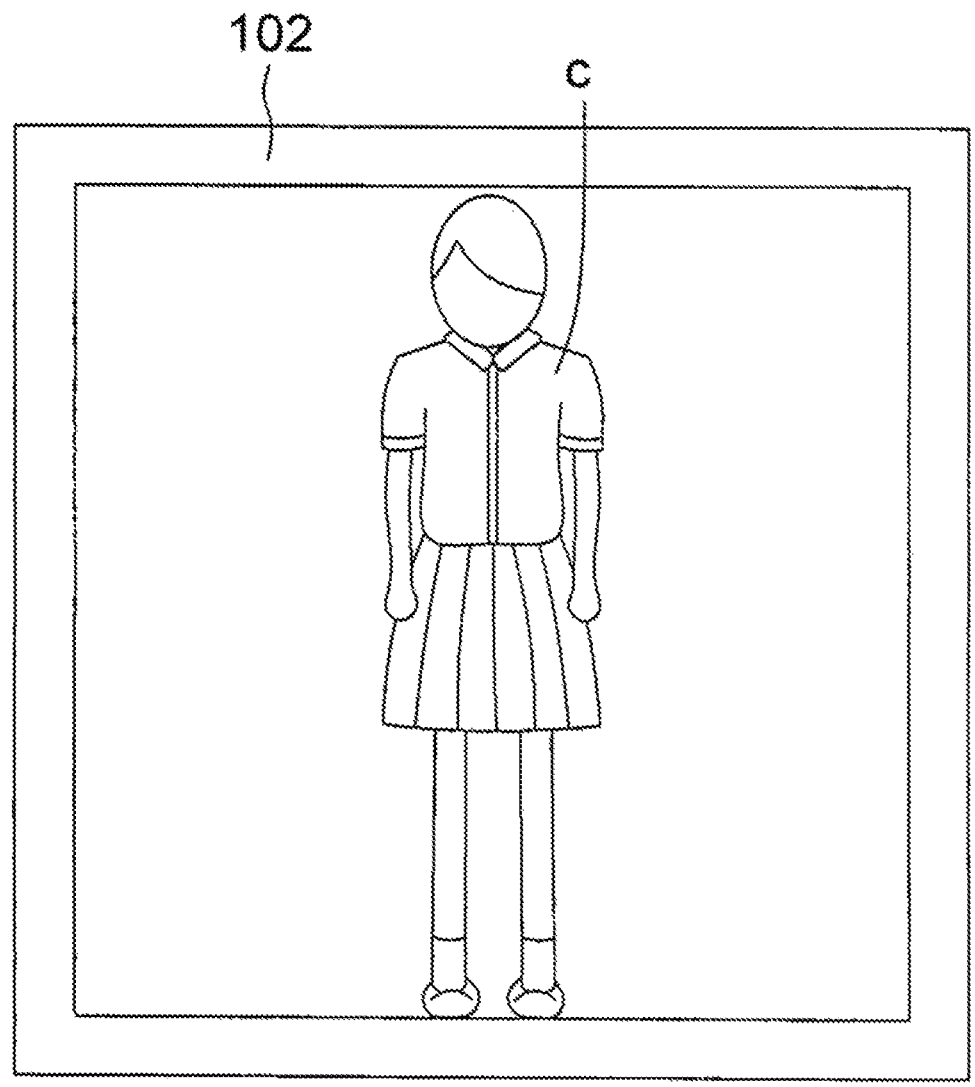
FIG. 13 is a view showing the third target object in the vehicle reversing image system of the prior arts.
Figure 14:
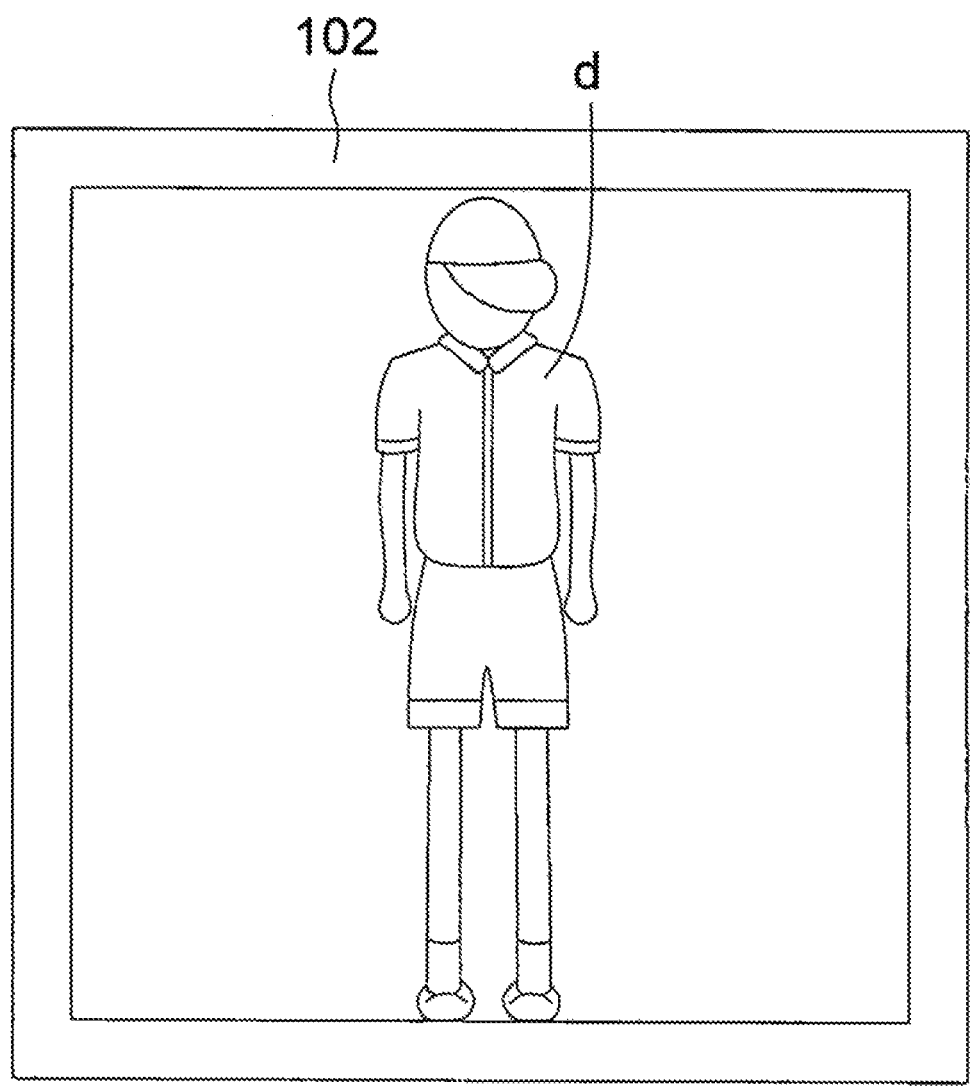
FIG. 14 is a view showing the fourth target object in the vehicle reversing image system of the prior arts.

Moreover, refer to FIGS. 6 to 8. FIG. 6 illustrates detection of the target objects through the image detection system of vehicle according to the second embodiment of the present invention, and FIGS. 7 and 8 respectively show detection of the third and fourth target objects. The distance between the third target object 24 and the vehicle 1 is the third distance L3, and the distance between the fourth target object 25 and the vehicle 1 is the fourth distance L4. The third height H3 of the third target object 24 is smaller than the fourth height H4 of the fourth target object 25. In the image detection system of vehicle according to the present invention, density variation of the mesh optical pattern 21 on the third target object 24 and the fourth target object 25 formed by the incident laser is collocated with the means of motion object detection (MOD) for image variation of the target object 2 so as to effectively determine the distance between the vehicle 1 and the third target object 24/the fourth target object 25. By comparing FIGS. 7 and 8, it is obvious that the optical pattern 21 of the third target object 24 formed on the image display region 62 of the display screen 61 has tighter density variation than the optical pattern 21 of the fourth target object 25, and the third target object 24 occupies the same area as the fourth target object 25 in the display screen 61. While the fourth target object 25 and the third target object 24 shown in the image display region 62 have the same size, the driver still knows the values or the relative distance of the third distance L3 and the fourth distance L4 through density variation of the mesh optical pattern 21 displayed on the image display region 62 or the distance value displayed on the distance display region 63, thereby preventing the driver from being perplexed or failing to determine or even resulting in false judgment.

Furthermore, the light source unit 3 of the third embodiment is a light flickering source with a flickering frequency as the same as the capturing frequency of the image capturing unit 4 such that the microprocessor 43 further compares two sequential images to determine variation of the optical patterns 21. That is, the image capturing unit 4 captures the image of the target object 2 and the optical pattern 21 on the target object 2 when the light source unit 3 illuminates, the image capturing unit 4 then captures the image of the same target object 2 and the optical pattern 21 on the same target object 2 when the light source unit 3 stops illuminating, and finally the microprocessor 43 subtracts the former image from the latter image and only keeps the optical patterns 21 so as to specifically determine the kind of the variation of the optical patterns 21.

Next, when the driver wants to keep safety for the vehicle 1 during reversing, the image detection system of vehicle according to the present invention can be provided at some appropriate place of the rear of the vehicle 1 so as to effectively detect the at least one target object 2 around the vehicle 1 and the distance between the vehicle 1 and the target object 2. As a result, the present invention prevents the driver from false judgment, and is advantageous to driving and personal safety. First, the driver may install the light source unit 3 and the image capturing unit 4 of the image detection system of vehicle according to the present invention at the certain appropriate place of the rear of the vehicle 1. The light source unit 3 comprises the light source 31, which is used to emit the light beam 311 like laser. The mesh optical pattern 21 is formed on the first target object 22 and the second target object 23. The optical pattern 21 has density variation as the distance between the vehicle 1 and the first target object 22/the second target object 23 shifts, and the image capturing unit 4 comprises the lens 41, the image sensor 42 like charge coupled device (CCD) connected to the lens 41, and the microprocessor 43 connected to the image sensor 42. The lens 41 captures the images of the first target object 22 and the second target object 23 and the optical pattern 21 to form the image on the image sensor 42 of the charge coupled device. The microprocessor 43 employs density variation of the optical pattern 21 formed on the CCD, and collocates with the means of motion object detection provided together in parallel for the image of the target object 2, thereby effectively calculating the values of the first distance L1 and the second distance L2. Next, the alarm unit 5 is internally provided in the vehicle 1, and electrically connected to the microprocessor 43. When the distance between the target object 2 and the vehicle 1 is smaller than the threshold value, the microprocessor 43 transmits the message to the alarm unit 5, and the alarm unit 5 based on the received message generates the alarm signal, which is one of sound, light and vibration, so as to effectively alert the driver to the traffic situation around the vehicle and further provide the advantage of sufficient alarm and diving safety. Finally, the display unit 6 is internally provided in the vehicle 1, and electrically connected to the image capturing unit 4, which comprises at least one display screen 61 provided at some suitable internal place of the vehicle 1. The display unit 6 comprises the image display region 62 and the distance display region 63. Specifically, the image display region 62 shows the image of the target object 2 captured by the lens 41 and the optical pattern 21 on the target object 2, and the distance display region 63 shows the distance between the target object 2 and the vehicle 1. For example, the image display region 62 and the distance display region 63 are shown in the same display screen 61, and the distance display region 63 is configured at the bottom-right corner of the image display region 62 such that both the image display region 62 and the distance display region 63 are viewed by the driver at the same time. The image detection system of vehicle according to the present invention primarily utilizes density variation of the optical pattern 21 and further collocates with the means of motion object detection to effectively calculate the distance between the target object 2 and the vehicle 1, thereby achieving the advantage of alerting the driver to driving safety.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An image detection system of a vehicle for detecting at least one target object around the vehicle and further detecting a distance between the at least one target object and the vehicle, comprising:
   a light source unit externally provided on the vehicle and configured to comprise at least one light source for emitting a light beam used to show at least one optical pattern on the target object, the optical pattern varying according to the distance between the target object and the vehicle;
   an image capturing unit externally provided on the vehicle corresponding to the light source unit, and comprising a lens, an image sensor connected to the lens, and a microprocessor connected to the image sensor, the lens capturing and transmitting an image of the target object and the optical pattern thereon to the image sensor, the microprocessor calculating the distance between the target object and the vehicle based on the varying optical pattern on the target object by combining a motion object detection (MOD) according to the varying image of the target object; and
   an alarm unit electrically connected to the microprocessor and internally provided in the vehicle, wherein the microprocessor transmits a message to the alarm unit when the distance between the target object and the vehicle is smaller than a threshold value, and the alarm unit generates an alarm signal based on the received message;
   wherein the light source unit is a light flickering source having a flickering frequency as the same as a capturing frequency of the image capturing unit, and the microprocessor compares two sequential images to determine variation of the optical patterns.

2. The image detection system of the vehicle as claimed in claim 1, wherein the image detecting system of the vehicle is further disposed a display unit internally provided in the vehicle, the display unit is electrically connected to the image capturing unit, and comprises at least one display screen, the display unit has an image display region and a distance display region, the image display region is used to show the image of the target object captured by the lens and the optical pattern on the target object, and the distance display region is configured to show a distance value between the target object and the vehicle.

3. The image detection system of the vehicle as claimed in claim 2, wherein the image display region and the distance display region are displayed on one display screen and different display screens.

4. The image detection system of the vehicle as claimed in claim 1, wherein the motion object detection (MOD) is implemented by the lens capturing the image of the target object, and the microprocessor determining the distance between the target object and the vehicle based on a density variation in images of the target object.

5. The image detection system of the vehicle as claimed in claim 1, wherein the at least one light source is a laser, a light emitting diode, and a phosphor capable of emitting the light beam.

6. The image detection system of the vehicle as claimed in claim 1, wherein the light beam is a visible light and invisible light.

7. The image detection system of the vehicle as claimed in claim 1, wherein the at least one optical pattern is implemented by a pattern formed of meshes, straight lines and regularly arranged dots.

8. The image detection system of the vehicle as claimed in claim 1, wherein the optical sensor is implemented by one of a CCD (Charge-Coupled Device) and a CMOS (Complementary Metal-Oxide-Semiconductor).

9. The image detection system of the vehicle as claimed in claim 1, wherein the alarm signal generated by the alarm unit is implemented by sound, light, and vibration.

* * * * *